(12) United States Patent
Voss

(10) Patent No.: US 11,968,443 B2
(45) Date of Patent: Apr. 23, 2024

(54) REMOTE CONTROL UNIT

(71) Applicant: Arnold & Richter Cine Technik GmbH & Co. Betriebs, Munich (DE)

(72) Inventor: Hendrik Voss, Munich (DE)

(73) Assignee: Arnold & Richter Cine Technik Gmbh & Co. Betriebs, Munich (DE)

( * ) Notice: Subject to any disclaimer, the term of this patent is extended or adjusted under 35 U.S.C. 154(b) by 0 days.

(21) Appl. No.: 18/220,016

(22) Filed: Jul. 10, 2023

(65) Prior Publication Data

US 2023/0353867 A1 Nov. 2, 2023

Related U.S. Application Data

(63) Continuation of application No. 17/749,358, filed on May 20, 2022, now Pat. No. 11,743,581.

(30) Foreign Application Priority Data

May 21, 2021 (DE) .......................... 202021102811.4

(51) Int. Cl.
*H04N 23/66* (2023.01)
(52) U.S. Cl.
CPC .................................. *H04N 23/66* (2023.01)
(58) Field of Classification Search
CPC ...... H04N 23/66; H04N 23/50; H04N 23/663; G03B 2205/0046; G03B 3/12; G03B 17/56
See application file for complete search history.

(56) References Cited

U.S. PATENT DOCUMENTS

| 4,742,478 | A | * | 5/1988 | Nigro, Jr. | G06F 1/166 361/679.55 |
| 6,161,933 | A | * | 12/2000 | Tschida | G03B 17/38 352/179 |
| 6,819,867 | B2 | * | 11/2004 | Mayer, Jr. | G03B 17/00 348/E5.042 |
| 8,199,251 | B2 | * | 6/2012 | Woodman | H04N 23/60 348/81 |
| 8,363,152 | B2 | * | 1/2013 | Haubmann | H04N 23/633 348/348 |
| 10,657,627 | B2 | * | 5/2020 | Douady-Pleven | B64C 39/024 |
| 2003/0025802 | A1 | * | 2/2003 | Mayer, Jr. | G03B 17/38 348/E5.042 |
| 2003/0206394 | A1 | * | 11/2003 | Ossia | G06F 3/0238 361/679.09 |
| 2003/0214601 | A1 | * | 11/2003 | Yuen | H04N 7/185 348/E5.042 |
| 2004/0125553 | A1 | * | 7/2004 | Castell | H04M 1/72412 361/679.56 |

(Continued)

*Primary Examiner* — Chiawei Chen
(74) *Attorney, Agent, or Firm* — Amster, Rothstein & Ebenstein LLP

(57) ABSTRACT

A remote control unit for controlling a motion picture camera comprises a grip section at a first side for holding the remote control unit, an extension section at a second side and a display section extending from the grip section to the second side. The display section comprises a display at a front side thereof, which is oriented orthogonal to a viewing axis. The extension section projects away from the display section. The extension section comprises an operating side facing away from the grip section, at which side a rotatable operating element for setting control commands is arranged.

17 Claims, 3 Drawing Sheets

(56) References Cited

U.S. PATENT DOCUMENTS

Figure 1:
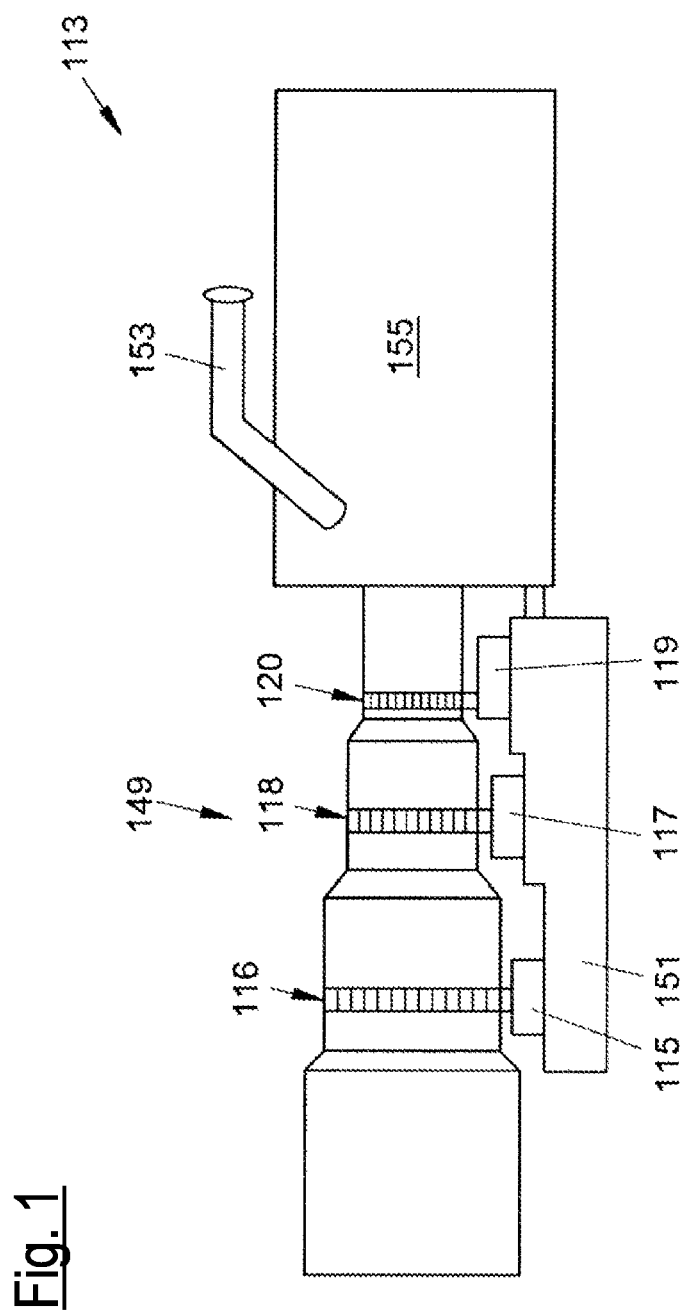

| | | | | |
|---|---|---|---|---|
| 2005/0275969 A1* | 12/2005 | Kinouchi | ............... | A45F 5/02 |
| | | | | 360/137 |
| 2008/0284899 A1* | 11/2008 | Haubmann | ............ | G03B 13/20 |
| | | | | 348/E5.045 |
| 2011/0128390 A1* | 6/2011 | Clark | ................... | H04N 23/71 |
| | | | | 348/E5.042 |
| 2011/0216483 A1* | 9/2011 | Vesely | ................. | G06F 1/1624 |
| | | | | 361/679.01 |
| 2012/0224078 A1* | 9/2012 | Woodman | ............ | H04N 23/60 |
| | | | | 348/E5.025 |
| 2012/0321287 A1* | 12/2012 | King | ..................... | G03B 15/05 |
| | | | | 39/56 |
| 2014/0010524 A1* | 1/2014 | Clark | ................ | G03B 15/0473 |
| | | | | 396/56 |
| 2014/0270687 A1* | 9/2014 | Jannard | ................. | H04N 9/806 |
| | | | | 386/224 |
| 2016/0353002 A1* | 12/2016 | Clark | ................... | H04N 23/66 |
| 2018/0192122 A1* | 7/2018 | Rajapakse | ........ | H04N 21/44227 |
| 2019/0043343 A1* | 2/2019 | Lee | ....................... | G08C 23/04 |
| 2020/0296277 A1* | 9/2020 | Tschida | ............... | H04N 23/661 |

\* cited by examiner

REMOTE CONTROL UNIT

This application is a continuation of U.S. patent application Ser. No. 17/749,358, filed May 20, 2022 and entitled Remote Control Unit, the contents of which are incorporated herein by reference in their entirety.

The present invention relates to a remote control unit for controlling a motion picture camera, in particular, an electronic motion picture camera and/or a film camera.

Such a remote control unit may, in particular, be provided for remotely adjusting parameters or settings of a motion picture camera during a motion picture recording, so that a cameraman guiding the motion picture camera can align the motion picture camera to a specific image frame or, for example, perform a camera pan, without, for example, also additionally having to be concerned with an adjustment of a focus distance or a zoom factor of the camera. Rather, such adjustments can be made more conveniently by means of the remote control unit and, for example, by a camera assistant, wherein the camera assistant may in particular set a sequence of control commands at the remote control unit as previously agreed with the cameraman, in order to adjust parameters of the motion picture camera during a recording.

Generally, such a remote control unit thus makes it possible to divide up the tasks of orienting the motion picture camera on the one hand and adjusting parameters and settings of the motion picture camera on the other hand during a recording with the motion picture camera, so that the two tasks can be fulfilled by different persons. However, in order to be able to achieve reliable control of a motion picture camera by means of the remote control unit, it is necessary to be able to adjust a plurality of parameters to be set for a motion picture camera by means of the remote control unit, to be able to overview current settings and parameters of the motion picture camera, and to be able to transmit a signal for controlling the motion picture camera reliably and without interference. At the same time, it is however desired, to configure the remote control unit to be portable, lightweight and compact, in order to allow comfortable handling and, for example, to allow movements of a camera assistant operating the remote control unit during a recording. However, the requirement for a compact configuration limits the possibilities for the arrangement of elements for operating the remote control unit or for checking settings and parameters of the motion picture camera at the remote control unit.

It is therefore an object of the invention to provide a remote control unit that enables a comfortable and reliable control of a motion picture camera, as well as the checking of current settings of the motion picture camera having a compact configuration.

This object is solved by a remote control unit having the features of claim 1, and in particular that the remote control unit comprises a grip section arranged at a first side of the remote control unit for holding the remote control unit, an extension section arranged at a second side of the remote control unit opposite the first side, and a display section extending along a base plane from the grip section to the second side of the remote control unit, wherein the display section comprises a front side and a rear side. The display section comprises a display at its front side, which is configured to display set control commands and/or values of parameters of the motion picture camera, wherein the display is oriented orthogonal to a viewing axis of the remote control unit. The extension section projects away from the display section along the viewing axis at the second side of the remote control unit. Further, the extension section comprises an operating side facing away from the grip section, at which a rotatable operating element for setting control commands for the motion picture camera is arranged.

The remote control unit thus comprises a display section arranged in a somewhat central manner, at the front side of which a display is supported, wherein a user of the remote control unit can look perpendicularly at the display along the viewing axis of the remote control unit and check set control commands and/or values of parameters of the motion picture camera. At the first side of the remote control unit, a grip section for holding the remote control unit adjoins this display section. In particular, the remote control unit can therefore be held one-handedly, whereby the display section and the display are not obscured by a hand of the user during use due to holding the remote control unit at a grip section provided specifically for this purpose. The grip section may be located at a position of use of the remote control unit, in particular at a left side of the remote control unit, so that the remote control unit can be held with the left hand. Generally, it is also possible, however, that the grip section is arranged on the right at the position of use of the remote control unit.

Due to the possibility to hold the remote control unit with one hand on the grip section, the other hand may remain free for operating the remote control unit and for setting control commands via the rotatable operating element. The arrangement of the operating element at the operating side of the extension section facing away from the grip section and projecting away from the display section at the second side of the remote control unit, moreover, allows the rotatable operating element to be operated with the free hand without having to grasp near the display to set control commands or having to make adjustments to the display section. A user may thus hold the remote control unit at the grip section and view the display along the viewing axis so as to simultaneously set control commands for the motion picture camera by means of the rotatable operating element at the operating side facing away from the grip section. The grip section may be grasped further from behind by the user, so that the remote control unit may be comfortably held and operated with the palms of the hands oriented substantially parallel to each other and perpendicular to the base plane of the remote control unit. The respective control commands set by means of the rotatable operating element may further be displayed on the display in real time to allow the user an extensive control of the settings of the motion picture camera by means of the display.

Further embodiments are found in the dependent claims, the description and the drawings.

In some embodiments, the display section may be configured substantially planar or curved. In particular, the display section may be configured planar and extend along or parallel to the base plane, so that the display section, in particular the front side of the display section, may be oriented perpendicular to the viewing axis of the remote control unit. However, the display section, in particular at its front side, may also be configured curved, at least in sections, so that, for example, a central and substantially planar formed section of the display section, at which the display is arranged, may be connected to the grip section and the extension section via lateral and curved sections.

In particular, in some embodiments, the display may be oriented in the base plane of the remote control unit or parallel to the base plane of the remote control unit. Thus, the display may be oriented perpendicular to the viewing axis of the remote control unit so that a user viewing along the viewing axis may comfortably read information displayed by the display. Such an orientation of the display may be provided for both a display section configured substantially planar or also curved.

In some embodiments, the operating side may be oriented perpendicular to the base plane. This allows the rotatable operating element to be gripped and operated from a direction oriented parallel to the base plane, so that the display section and the display may remain unobstructed and fully visible during a setting of control commands using the rotatable operating element. Moreover, with such an orientation of the operating side, the operating element can be operated comfortably and with a natural hand posture while the remote control unit is held at the opposing grip section.

In some embodiments, the extension section may project perpendicularly away from the display section and/or be oriented perpendicular to the base plane. In particular, the display section may be oriented parallel to the base plane and the extension section may be oriented perpendicular to the base plane. Furthermore, the display section may be configured rectangular in cross-section, particularly in any cross-section, perpendicular to the base plane and/or the extension section may be configured rectangular in cross-section, particularly in any cross-section, parallel to the base plane. The display section may further have a constant thickness perpendicular to the base plane.

The grip section may extend beyond the rear side of the display section at a rear side of the remote control unit.

In some embodiments, the grip section may be configured so as to be grasped circumferentially on three sides by a user's hand. In particular, the grip section may be grasped circumferentially by a user's hand from a front side of the remote control unit to a rear side thereof, wherein at the front side of the remote control unit the grip section may rest against the heel of the user's hand and can be grasped by the user's fingers. However, the display section of the remote control unit adjoining the grip section may prevent a complete grasping of the grip section.

Further, in some embodiments, the grip section may transition to a grip recess at the rear side of the remote control unit. In particular, a user of the remote control unit may grasp around the grip section with the holding hand and engage such a grip recess with one or more fingers to enable comfortable and secure holding of the remote control unit.

In some embodiments, the grip section may be configured at least partially curved. In particular, the grip section may be configured cylindrical and/or barrel-shaped at least in sections. Such a configuration allows the grip section to rest against a large area of the gripping hand of a user, while also allowing a natural grasping of the grip section.

In some embodiments, the remote control unit may further comprise a radio module configured to wirelessly transmit the set control commands to the motion picture camera. Alternatively or additionally, the radio module may be configured to wirelessly receive values of parameters of the motion picture camera. In particular, the parameters may relate to a focus value, a focal length, an iris aperture and/or a zoom factor. The control commands which can be set by means of the rotatable operating element may represent in particular desired values for the said parameters and/or for one of the said parameters.

Thus, such a radio module can be provided to enable communication between the remote control unit and the motion picture camera in order to be able to transmit control commands and/or receive current settings or values of parameters of the motion picture camera. Information transmitted and/or received by the radio module may in particular be shown on the display, so that a user may check at the remote control unit current or carried-out settings of the motion picture camera. The radio module may, for example, be configured to communicate wirelessly with the motion picture camera via a Bluetooth connection, a WLAN/Wi-Fi connection and/or a mobile-communication connection.

In some embodiments, the radio module may comprise an antenna, wherein the antenna may be positioned at the extension section of the remote control unit. Such an arrangement of the antenna particularly allows the antenna to be spaced apart from the display section and to prevent interference of the mobile signal due to electronic components disposed in the display section and/or a metal housing of the remote control unit, so that a good emission and reception characteristic of the radio module can be achieved. Furthermore, by positioning the antenna of the radio module at the extension section, an upper side of the display section, at which conventionally the antenna would be arranged, can be kept free and made available for other applications, as will be further explained below.

In some embodiments, the antenna of the radio module may be positioned at an end portion of the extension section facing away from the display section. The distance between the antenna and the display section along the viewing axis of the remote control unit can thus be maximized to reliably avoid any interference to the radio signal due to a metal housing or electronic components of the display section. In addition, an antenna positioned in such a manner is not located in a transition area between the extension section and the display section, so that, for example, movements of the user's hand during operation of the remote control unit to initially perform a control command by means of the rotatable operating element and then make settings at the display section, for example at the display, are not affected by the antenna.

In some embodiments, the antenna of the radio module may be positioned at an upper side of the extension section and/or may protrude from an upper side of the extension section. In particular, the antenna may further be configured to be elongated and/or rod-like.

In some embodiments, the radio module may be detachably connected to the extension section of the remote control unit. In addition, the radio module may be selectively connectable to the extension section of the remote control unit.

By means of a detachable connection of the radio module to the remote control unit, in particular different radio modules may be selectively connectable to the remote control unit, to enable, for example, a communication of the remote control unit via different radio standards and/or radio frequencies. For example, the remote control unit may be adaptable to a motion picture camera to be controlled, which is configured to communicate via a particular radio standard or particular radio frequency, in that a radio module communicating via the corresponding radio standard or radio frequency is connected to the extension section. The remote control unit may thus not only be used to control such motion picture cameras that use a radio standard and/or a radio frequency specified by the remote control unit, but rather the remote control unit can conversely be flexibly adapted to a respective radio standard and/or a radio frequency used by a motion picture camera to be controlled.

In some embodiments, the extension section of the remote control unit may comprise a receptacle in which the radio module can be inserted. In particular, the extension section may comprise such a receptacle at a side opposite the operating side, in which the radio module may be removably received. The receptacle may also be open on an upper side of the extension section so that the radio module can be inserted in the receptacle at the upper side.

In some embodiments, the radio module inserted in the receptacle may be removable from the receptacle without tools. In addition, the radio module may be insertable in the receptacle without tools. In particular, this can allow a quick and uncomplicated adapting of the remote control unit when, for example, during a shoot different scenes are recorded using different motion picture cameras that communicate via different radio standards. In particular, the radio module may be manually inserted in the receptacle at an upper side of the extension section and may be manually pushed and/or pulled out of the receptacle in the direction of the upper side of the extension section without requiring any tools.

In some embodiments, the radio module may be insertable in the receptacle from an upper side of the extension section. Accordingly, the receptacle may be open at an upper side of the extension section. As explained above, at the upper side of the extension section, in particular also an antenna of the radio module may be positioned and/or protrude from the upper side. The antenna may therefore be positioned outside the receptacle and/or protrude therefrom, when the radio module is inserted in the receptacle.

In some embodiments, the radio module may be insertable in the receptacle by a linear movement. The linear movement may take place along a direction oriented parallel to the base plane and, in particular, may lead from an upper side of the extension section in the receptacle.

In some embodiments, the radio module may comprise a cuboid-shaped radio module body insertable in the receptacle. In such embodiments, the radio module may further comprise an antenna which protrudes from the radio module body. In particular, the radio module body may be insertable in the receptacle in such a way, that an antenna projecting away from the radio module body protrudes at an upper side of the extension section. In addition, the antenna may be arranged at a section of the radio module body that is opposite to the display section when the radio module body is inserted in the receptacle.

In some embodiments, the receptacle may support the inserted radio module on five sides. In particular, the receptacle may support the radio module body of the inserted radio module on five sides. With such support, the radio module may be inserted in and removed from the receptacle along one direction only, so that the radio module may be securely held in the receptacle during use of the remote control unit, but also may be intentionally removed from the receptacle in a simple manner. Alternatively or additionally, the radio module, in particular the radio module body, may also lock into the receptacle to prevent unintentional release or movement of the radio module during use of the remote control unit.

The receptacle may be configured at a side of the extension section facing away from the rotatable operating element. The operating side can therefore be available, in particular exclusively, for arranging the rotatable operating element. Further, by such arrangement of the receptacle, the radio module may be positioned between the grip section and the operating element so that unintentional contact with the radio module during use of the remote control unit may be avoided.

In some embodiments, the radio module may have at least one broadside forming a side surface of the radio module having the largest areal extent, wherein the receptacle overlaps the inserted radio module at the side facing away from the rotatable operating element with at least two edge sections oriented perpendicular to each other so that the at least one broadside remains substantially visible.

In that, the broadside of the radio module is overlapped by at least two edge sections oriented perpendicular to each other, the radio module may be held securely in the receptacle at the side of the extension section facing away from the rotatable operating element. For this purpose, the edge sections of the receptacle may be configured, for example, as webs and/or tongues. Since in such embodiments, the broadside is not completely covered by the edge sections, but rather remains substantially visible, a user may selectively push the radio module out of the receptacle via its broadside and, for example, can use a thumb to do so.

In particular, the radio module thus does not have to be pulled out by the antenna to be removed from the receptacle.

In addition, such a configuration of the receptacle allows any labeling or marking of the radio module at the side facing away from the operating element to remain visible. For example, a user may therefore immediately check which radio module is inserted in the receptacle and/or over which radio standard and/or radio frequency a communication with the remote control unit is possible.

In some embodiments, the receptacle may be partially open at a side facing away from the display section and may overlap in sections the inserted radio module. With such a sectional overlap, the radio module may be held securely in the receptacle at the side facing away from the display section, while at the same time an access for removing the radio module from the receptacle and/or for checking any labeling of the radio module is allowed.

In some embodiments, the remote control unit may comprise a plurality of radio modules, one of which may selectively be inserted in the receptacle, wherein a first radio module of the plurality of radio modules is configured to communicate via a first radio standard and/or a first radio frequency, and wherein a second radio module of the plurality of radio modules is configured to communicate via a second radio standard and/or a second radio frequency. Furthermore, the first radio standard may be different from the second radio standard and/or the first radio frequency may be different from the second radio frequency. In particular, all of the plurality of radio modules may selectively be insertable in the receptacle, wherein, however, at all times, only one of the plurality of radio modules may be received in the receptacle and connected to the remote control unit. As explained above, by selectively inserting one of the plurality of radio modules in the receptacle, the remote control unit may be adapted to communicate via the respective radio standard or respective radio frequency used by the radio module.

This allows the remote control unit to be selectively and flexibly adapted to different motion picture cameras in order to be able control a plurality of motion picture cameras by means of the remote control unit.

In some embodiments, the display section of the remote control unit may comprise an upper side extending from the grip section to the second side of the remote control unit, wherein an attachment device for attaching an accessory device, in particular a viewing monitor, may be arranged at the upper side of the display section.

Such an attachment device makes it in particular possible to expand the functionality of the remote control unit by way of an additional accessory device. For example, a viewing monitor may be attachable at the upper side of the display section by means of the attachment device, by means of which a user of the remote control unit may check and view an image frame recorded by the moving picture camera. The corresponding image data may be received from the camera, in particular, by means of the aforementioned radio module. The user of the remote control unit may use such a viewing monitor, for example, to check or follow the recording, in order to make, if necessary, adjustments to the settings of the motion picture camera by means of the remote control unit. In particular, such an attachment device may be provided in embodiments in which an antenna of a radio module, as explained above, is positioned at the extension section, so that, unlike conventional remote control units, the upper side of the display section may be kept free for an selectively attachable accessory device.

In some embodiments, the attachment device may be configured so as to attach the accessory device by a form-fitting engagement or by at least one fastening means or by a combination thereof. For example, the accessory device may be slidable, attachable, and/or hooked at the upper side of the display section to achieve a form-fitting engagement. Alternatively or additionally, the accessory device may, for example, be screwable at the upper side of the display section.

In some embodiments, the upper side of the display section may comprise a planar surface. The planar surface may further be oriented transverse, in particular perpendicular, to the base plane and/or the display section.

In some embodiments, the grip section may comprise a planar surface at an upper side thereof, which adjoins the surface of the display section and continues in a common plane with the surface of the display section. In particular, the grip section and the display section, or the surfaces thereof, may together support at their upper sides an accessory device attached by the attachment device.

In some embodiments, the attachment device may comprise a fastening rail. In particular, such a fastening rail may allow a form-fitting engagement of an accessory device, which may be slid onto the remote control unit via the fastening rail and/or hooked to the fastening rail.

In some embodiments, the remote control unit may comprise at least one accessory device that is attachable at the upper side of the display section by being slid onto the fastening rail or by being hooked to the fastening rail. In particular, this enables the accessory device, which in particular may be a viewing monitor, to be attached quickly and without tools.

Alternatively or additionally, in some embodiments, the attachment device may comprise at least one fastening recess configured at the upper side of the display section. In particular, such a fastening recess may be a screw hole. For example, an accessory device may thereby be securely screwed at the upper side of the display section and securely, but selectively releasably, connected to the remote control unit.

In some embodiments, the remote control unit may comprise at least one accessory device that is attachable at the upper side of the display section by means of a fastening means that is insertable into the fastening recess. In particular, the accessory device may be attachable at the upper side of the display section by means of a fixing screw insertable into the fastening recess.

Further, in some embodiments, the remote control unit may comprise at least one accessory device which is slidable onto a fastening rail of the attachment device and/or hooked to the fastening rail, wherein the accessory device can be additionally attached at the upper side of the display section by a fastening means that is insertable into the fastening recess.

An attachable monitor selectively connectable to the remote control unit as an accessory device, may in particular comprise a display which extends in a viewing plane, wherein the viewing plane may be oriented perpendicular, inclined or parallel to the base plane when the viewing monitor is attached to the remote control unit. In particular, the viewing plane may extend inclined from the front side of the display section upwards in the direction of the rear side of the display section, so that a user of the remote control unit may comfortably view both the display of the display section and the display of the viewing monitor. In addition, the surface of the display section, to which the attachable monitor can be attached, may, for example, be oriented inclined to the base plane. Alternatively to this, the surface of the display section may, however, also be oriented perpendicular to the base plane, for example, and the attachable monitor may comprise a display oriented inclined to the surface of the display section in the attached state.

In some embodiments, the remote control unit may be configured to be placed down on a horizontal ground plane in a stable inclined standing position such that, the viewing axis of the remote control unit intersects the ground plane at an acute angle of orientation. In particular, the viewing axis of the remote control unit placed down in the inclined standing position may intersect the ground plane at an angle between 25 degrees and 60 degrees and/or at an angle of 30 degrees or 45 degrees.

In that, the viewing axis of the remote control unit in its inclined standing position is oriented at an acute angle of orientation to the horizontal, the display extending perpendicular to the viewing axis may be oriented inclined to the vertical when the remote control unit is placed down. This allows, for example, a user of the remote control unit to briefly place down the remote control unit on a table during a recording and to be able to comfortably view the display from a natural viewing angle, so as to able to monitor the recording and the settings of the motion picture camera.

In some embodiments, the viewing axis of the remote control unit may intersect the ground plane in the direction of the rear side of the remote control unit when the remote control unit is placed down. Alternatively or additionally, in some embodiments, the display of the display section may face upward when the remote control unit is placed down. Thus, a user looking along the viewing axis of the remote control unit may comfortably view the display when the remote control unit is placed down on the horizontal ground plane.

In some embodiments, an upper edge of the display section may be oriented horizontally when the remote control unit is placed down. In particular, an upper edge of the display may be oriented horizontally when the remote control unit is placed down. Accordingly, when the remote control unit is placed down in the inclined standing position, the display section and/or the display with respect to the vertical may be tilted about an axis that runs horizontal and in the base plane of the remote control unit or parallel to the base plane of the remote control unit, without however, being rotated about an axis oriented perpendicular to the base plane. This tilting of the display section may in particular be compared with an orientation of the remote control unit in which the base plane is oriented vertically. Information shown on the display can therefore be read by the user in the inclined standing position, without the information being shown rotated about the viewing axis.

In some embodiments, the extension section of the remote control unit may comprise a planar support section at an underside. Alternatively or additionally, the display section of the remote control unit may comprise a planar support section at an underside. Furthermore, alternatively or additionally, the grip section of the remote control unit may comprise a planar support section at an underside. The respective support section may be oriented at an angle of placement to the base plane of the remote control unit, wherein the angle of placement of the respective support section may correspond to a value of 90 degrees minus the acute angle of orientation of the viewing axis.

In particular, the remote control unit may be placed down to rest on the respective planar support section, so that due to the orientation of the respective support section at the angle of placement to the base plane, may result in the acute angle of orientation of the viewing axis to the ground plane.

In particular, the display section and/or the grip section may comprise a support section oriented at the angle of placement to the base plane which is formed by an edge of the display section or the grip section facing the rear side of the remote control unit. The remote control unit can be placed down on a planar support section of the extension section and on such an edge of the display section and/or the grip section. Alternatively, the edges of the display section or of the grip section, may however also form a right-angled corner at the underside of the remote control unit, wherein the remote control unit in the inclined standing position, nevertheless, may be supported by the edges of the grip section and of the display section and by a support section, in particular a flat support section, of the extension section oriented at the angle of orientation to the base plane.

In some embodiments, the remote control unit may be configured to be selectively placed down on the horizontal ground plane in a stable upright position, such that the viewing axis of the remote control unit is oriented parallel to the ground plane. The display section of the remote control unit may comprise a planar further support section at the underside and/or the grip section of the remote control unit may comprise a planar further support section at an underside, wherein the respective further support section is oriented orthogonal to the base plane of the remote control unit. In particular, the remote control unit may be stably supported in the upright position on the horizontal ground plane by such further support sections.

Further, in some embodiments, the remote control unit may be selectively placed down in the upright position or in the inclined standing position. For example, this allows a user to choose between the upright position and the inclined standing position depending on the height of the ground plane when the remote control unit is placed down, in order to be able to comfortably view the display section and/or the display along the viewing axis.

In some embodiments, by rotating the rotatable operating element, a control command for a lens setting motor of the motion picture camera and/or a control command for changing a focus distance of the motion picture camera can be set. Accordingly, a motion picture camera controllable by means of the remote control unit may comprise one or more lens setting motors, which may be configured to rotate a respective lens-ring of a lens of the motion picture camera to thereby adjust a parameter of the motion picture camera. In particular, a focus distance, a focal length, an iris aperture and/or a zoom factor may be adjustable by such lens setting motors or by rotating a corresponding lens-ring.

In particular, by rotating the rotatable operating element, a focus distance of the motion picture camera can be continuously changed. Alternatively, however, also other parameters of the motion picture camera, in particular the aforementioned focal length, an iris aperture or a zoom factor can be set by the rotatable operating element. Furthermore, it can be provided for, that the respective parameter of the motion picture camera that can be set by means of the rotatable operating element is selectable at the remote control unit, for example, in order to be able to adjust a parameter that is to be changed primarily during a specific scene by means of the rotatable operating element.

In some embodiments, at least one further operating element for setting further control commands for the motion picture camera may be arranged at the display section of the remote control unit. In particular, one or more buttons and/or one or more sliders for setting further control commands for the motion picture camera may be arranged at the display section. The at least one further operating element may, in particular, be arranged at the front side of the display section, so that a user may also keep the further operating element in view during use of the remote control unit without having to move or rotate the remote control unit. The control commands set by means of the further operating element and/or values of parameters of the motion picture camera that can be influenced by means of the further operating element, may be displayable on the display to enable checking of these parameters and control commands. Alternatively or additionally, it may also be provided for, that the display section comprises a scale associated with the further operating element, so that the set control command may be read based on the position of the further operating element or based on a marking relative to the scale which is arranged at the operating element.

In some embodiments, by operating the at least one further operating element, a control command for a further lens setting motor can be set. For example, in such embodiments, by operating the at least one further operating element, a desired value for an iris aperture, a zoom factor and/or a focal length of the motion picture camera can be set. In particular, by means of the rotatable operating element a focus distance of the motion picture camera may be settable by actuating a corresponding lens setting motor, wherein the remote control unit may comprise at least one further operating element by means of which an iris aperture, a zoom factor and/or a focal length of the motion picture camera can be set by actuating a corresponding lens setting motor of the motion picture camera.

In the following, the invention is explained purely by way of example on the basis of an example embodiment with reference to the drawings.

There are shown:

FIG. 1 a schematic representation of a motion picture camera

Figure 2A:
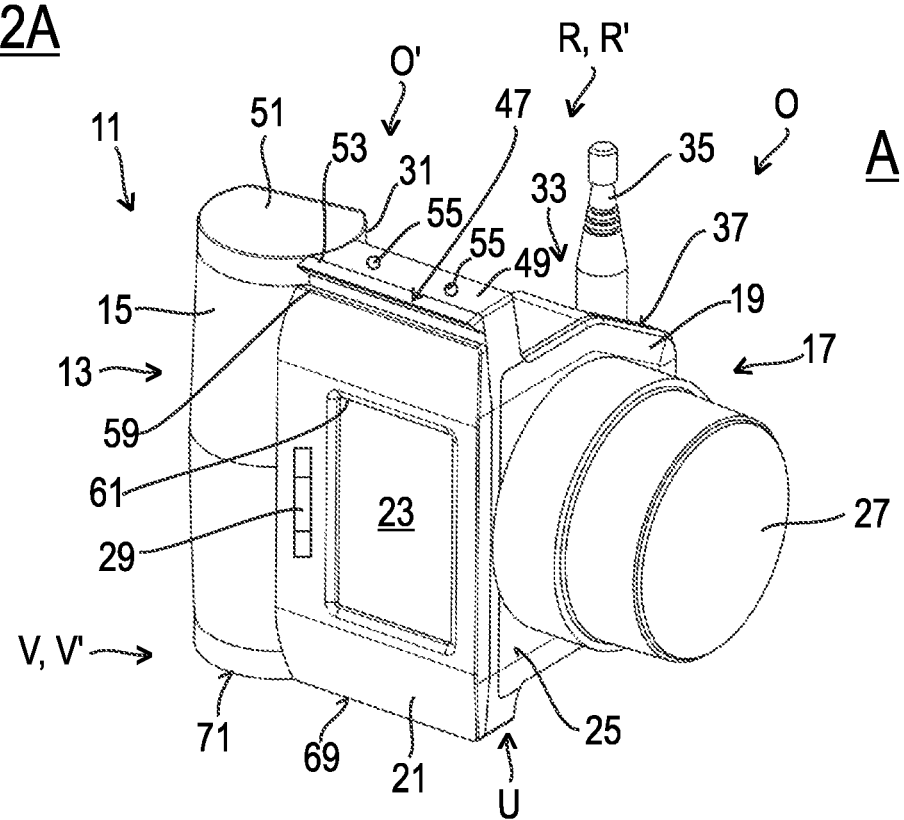
Figure 2B:
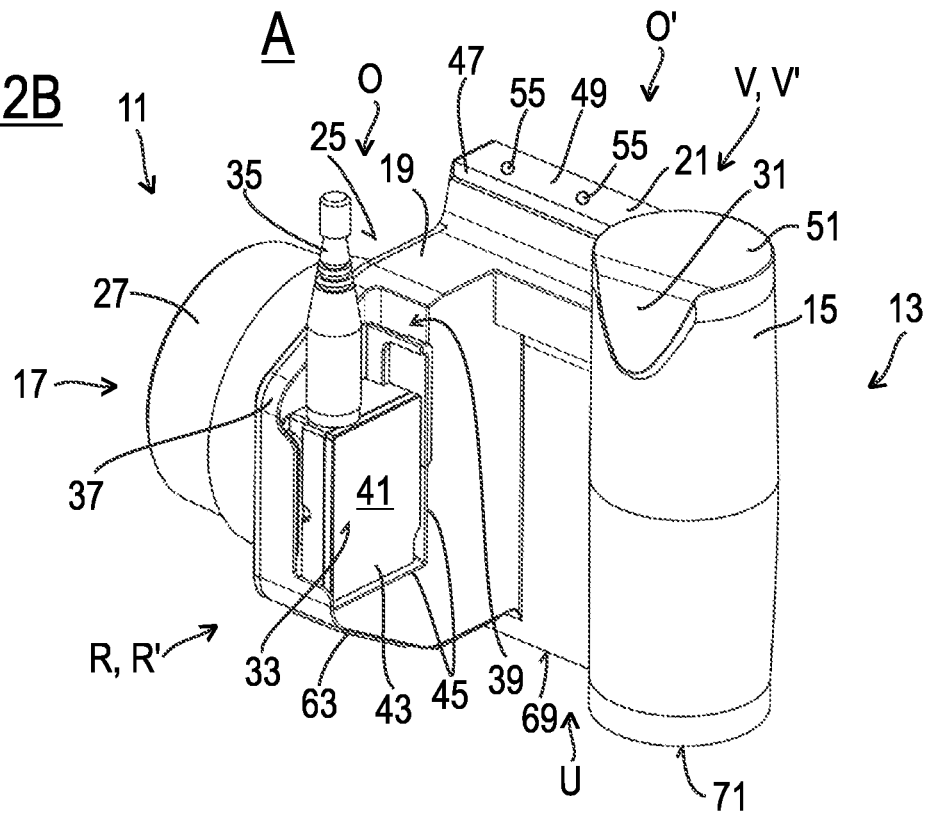
Figure 3A:
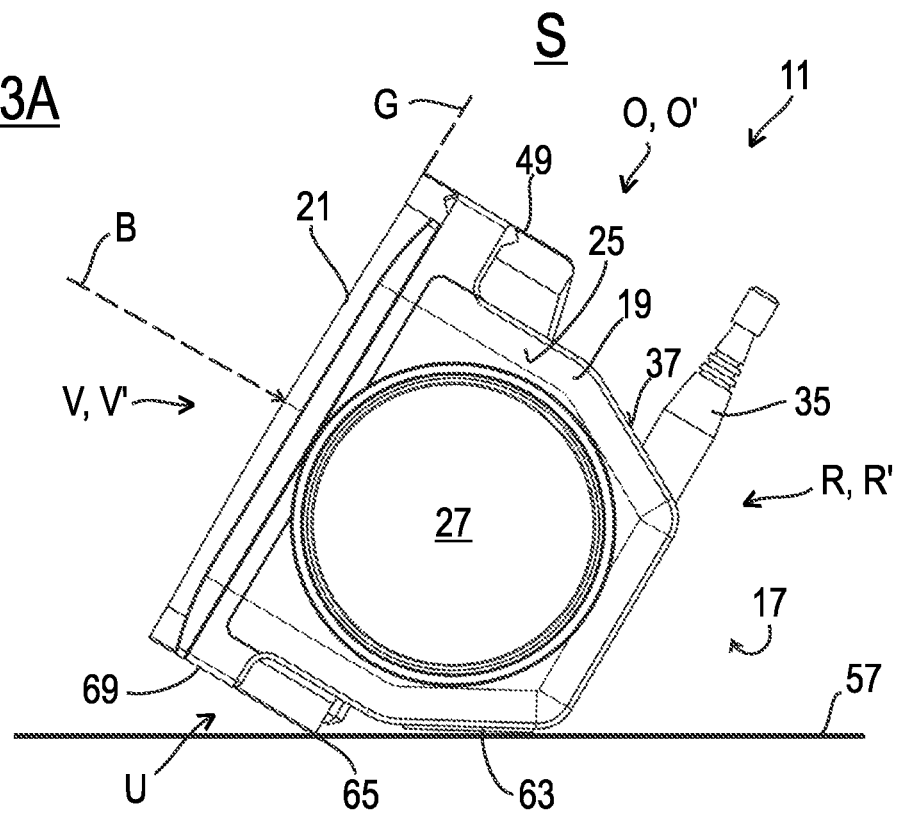
Figure 3B:
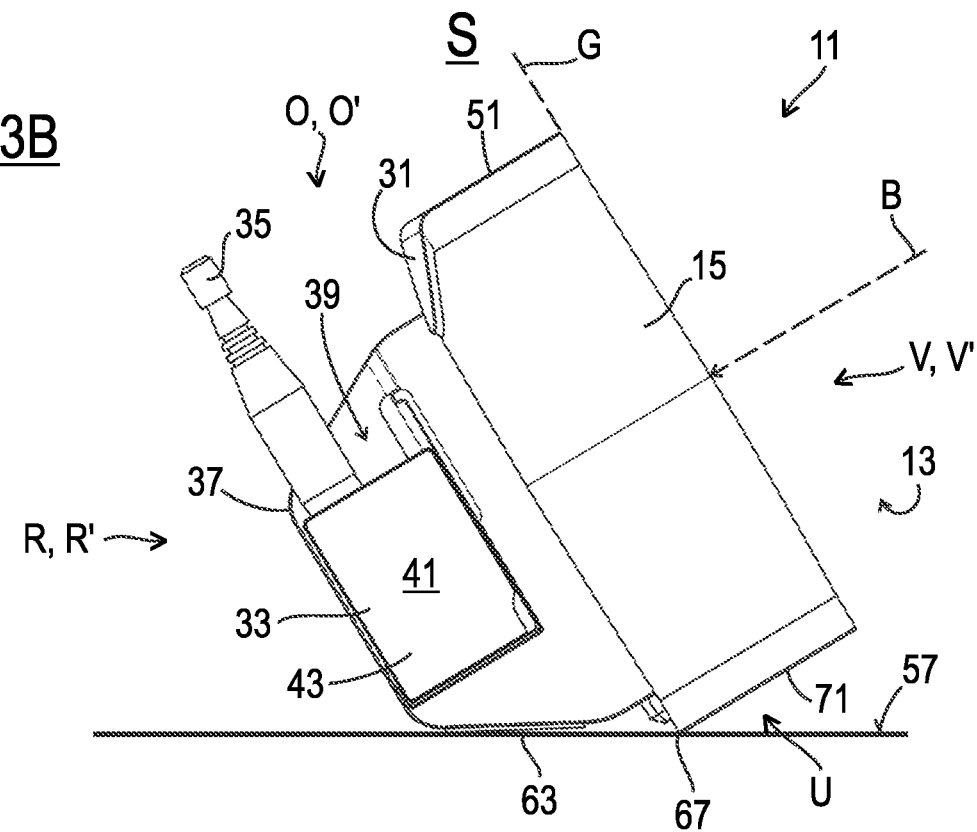

FIGS. 2A and 2B a perspective front view or rear view of a remote control unit for controlling the motion picture camera, wherein the remote control unit extends from a first side to a second side, and FIGS. 3A and 3B a side view of a second side or of the first side of the remote control unit, wherein the remote control unit is placed down in an inclined standing position on a horizontal ground plane.

FIG. 1 shows a motion picture camera 113, which in particular may be an electronic motion picture camera or a film camera. The illustrated motion picture camera 113 comprises a camera body 155 at which an interchangeable lens 149 is mounted. This interchangeable lens 149 comprises three lens-rings 116, 118 and 120 that may be adjusted by means of respective external lens setting motors 115, 117 and 119. For example, the first lens-ring 116 may be provided to set a focus distance of the lens 149, while, for example, by rotating the second lens-ring 118 a desired focal length setting may be performed. Further, the third lens-ring 120 may be provided in particular for setting an iris aperture by means of the associated third lens setting motor 119. The setting motors 115, 117 and 119 are part of a lens-ring drive unit 151 which is connected to the camera body 155 (e.g., via holding bars), but may be a separate and independent unit from the motion picture camera 113. The setting motors 115, 117, 119 and the lens-ring drive unit 151 are, however, associated with a respective motion picture camera 113 via the interchangeable lens 149 used. The lens-ring drive unit 151 may comprise a communication interface and/or control circuitry for receiving control commands for the motion picture camera 113 or for the lens setting motors 115, 117 and 119. Alternatively, such a communication interface and/or control circuitry may also be arranged within the camera body 155, wherein the control commands may be transmitted to the drive unit 151. Furthermore, a viewfinder 153 is arranged at the camera body 155, by means of which a cameraman guiding the motion picture camera 113 may target an image frame to be recorded.

By equipping the motion picture camera 113 with an interchangeable lens 149 which is connectable to the camera body 155, generally, differently configured lenses 149 may also be connected to the camera body 155, in order to be able to flexibly provide a motion picture camera 113 which enables optimal settings for a scene to be recorded. For example, fixed focal length lenses 149 may also be provided, which have only two lens-rings 116 and 120 for adjusting the focus distance and the iris aperture by means of associated setting motors 117 and 119. Alternatively, a motion picture camera may, however, also be configured with a fixed connected lens.

During a recording of a scene, it is usually provided for, that the camera 113 or its lens 149 is moved by a cameraman in order to aim at a respective image frame to be recorded. Corresponding adjustments to parameters of the motion picture camera 113 which possibly have to be made with such a change of image frame, for example the focus distance, are, however, usually made by a camera assistant or a focus puller by means of a remote control unit 11, which is configured to transmit corresponding control commands to the motion picture camera 113 and/or the drive unit 151. Such a remote control unit 11 requires a compact design, whereby, however, possibilities must be provided for extensively and reliably controlling a motion picture camera 113 or the motion picture camera 113, and for checking set parameters of the motion picture camera 113. One embodiment of such a remote control unit 11 is illustrated with reference to FIGS. 2A to 3B.

The remote control unit 11 comprises a grip section 15 arranged at a first side 13 of the remote control unit 11 for holding the remote control unit 11, from which a display section 21 extends along a base plane G to a second side 17 of the remote control unit 11 opposite the first side 13 (cf. FIGS. 2A and 3A). At the second side 17, an extension section 19 projects away from the display section 21 along a viewing axis B of the remote control unit 11 oriented perpendicular to the base plane G. The extension section 19 thus protrudes from the display section 21 in the direction of a rear side R' of the remote control unit 11.

The display section 21 has a front side V and a rear side R, wherein the grip section 15 extends beyond the rear side R of the display section 21 at the rear side R' of the remote control unit 11, so that a user of the remote control unit 11 may grasp around the grip section 15 starting from a front side V' of the remote control unit 11 and can hold the remote control unit 11 with one hand. The grip section 15 is curved in sections and, in particular, is configured cylinder-shaped or barrel-shaped, in order to be able to rest extensively against a hand and to allow a comfortable grasp of it. In addition, a grip recess 31 is formed at the grip section 15 at the rear side R' of the remote control unit 11, with which a user can engage while holding the remote control unit 11.

A display 23 is arranged at the front side V of the display section 21 adjoining the grip section 15, which display 23 is configured to display control commands for the motion picture camera 113 set by means of the remote control unit 11 and/or values of parameters of the motion picture camera 113. The display section 21 extends substantially planar along the base plane G of the remote control unit 11, and also the display 23 extends along the base plane G and perpendicular to the viewing axis B. Thus, a user looking along the viewing axis B at the remote control unit 11 may comfortably read the information shown on the display 23.

In the embodiment of the remote control unit 11 shown, the grip section 15 is arranged such that, a user can hold the remote control unit 11 single-handed with the left hand so that the right hand remains free for setting control commands for the motion picture camera 113, for example. In order to be able to set such control commands, the extension section 19 comprises an operating side 25 facing away from the grip section 15, at which a rotatable operating element 27 for setting control commands for the motion picture camera 113 is arranged. For example, it may be provided for, to set a control command for one of the lens setting motors 115, 117 or 119 of the motion picture camera 113 by rotating the operating element 27, in order to, for example, be able to change a focus distance of the motion picture camera 113 by means of the lens-ring 116. Alternatively, however, it may also for example be provided for, to set a control command for adjusting a focal length, a zoom factor or an iris aperture of the motion picture camera 113 by rotating the operating element 27. Generally, a control command set at the remote control unit 11 may represent a desired value for one of said parameters.

By extending the display section 21 along the base plane G from the grip section 15 to the second side 17 of the remote control unit 11 at which the operating element 27 is arranged, a compact configuration of the remote control unit 11 with greater visibility and ease of operation can be achieved. In particular, the operating element 27 which faces away from the grip section 15 may be rotated without thereby impairing a user's view of the display 23. A user can thus always keep an eye on the display 23 and, for example, check set control commands and/or parameters of the motion picture camera 113 whilst operating the remote control unit 11. In particular, the control commands set by means of the operating element 27 may be directly displayed on the display 23, so that the user, while rotating the operating element 27, may check at the display 23 whether the desired control command and/or a desired value of a parameter of the motion picture camera 113 to be changed is set.

Furthermore, a further operating element 29 is arranged at the front side V of the display section 21, which is configured as a slider. By actuating the further operating element 29, which can be done, for example, by means of a thumb while holding the remote control unit 11, in particular, a further control command can be transmitted to a further lens setting motor 115, 117 or 119 of the motion picture camera 113, in order to, for example, be able to selectively set a focal length, a zoom factor or an iris aperture in addition to a focus distance which can be set by means of the operating element 27. Generally, further operating elements not shown here, such as further sliders and/or buttons, may also be arranged at the front side V of the display section 21, in order to enable the most extensive control of the motion picture camera 113 as possible. The further control command set by means of the further operating element 29 may also be displayed on the display 23, wherein, alternatively or additionally, for the further operating element 29, a scale may be provided at the front side V of the display section 21 in order to be able to read its position and thus the set control command.

In order to be able to transmit the set control commands to the motion picture camera 113, the remote control unit 11 comprises a radio module 33, which is configured to wirelessly transmit to the motion picture camera the control commands set by means of the rotatable operating element 27 and/or the further operating element 29, and/or to wirelessly receive values of parameters of the motion picture camera (cf. FIGS. 2B and 3B). In particular, the radio module may receive a focus value, a focal length, an iris aperture and/or a zoom factor from the motion picture camera 113. Both the control commands transmittable by means of the radio module 33 and the received values of parameters of the motion picture camera 113 may be shown in real time on the display 23, so that a user may check at any time at the display 23 the actual values and/or set desired values of parameters of the motion picture camera 113.

In particular, the radio module 33 may be configured to communicate with the motion picture camera 113 via a Bluetooth connection, a WLAN/Wi-Fi connection, and/or a mobile-connection. In order to be able to establish and maintain a reliable wireless connection with the motion picture camera 113, the radio module 33 comprises an antenna 35, wherein the antenna 35 is positioned at the extension section 19. In particular, the antenna 35 is positioned at an end portion 37 of the extension section 19 which faces away from the display section 21. As a result, the antenna 35 is arranged at a distance from the display section 21, so that generally, possible interference of the radio signal by electronic components arranged in the display section 21 or by a metal housing of the display section 21 can be prevented. Moreover, the antenna 35 protrudes from an upper side O of the extension section 19 so that the antenna 35 points away from the user during use of the remote control unit 11 and does not interfere with the user's handling of the remote control unit 11.

In the embodiment of the remote control unit 11 shown, the radio module 33 is detachably connected to the extension section 19. This makes it possible to selectively connect the radio module 33 to the extension section 19 and thus to the remote control unit 11, or to detach it from the extension section 19. For this purpose, the extension section 19 comprises a receptacle 39 at a side opposite the operating element 27, in which the radio module 33 is inserted (cf. FIGS. 2B and 3B). In particular, the radio module 33 comprises a cuboid-shaped radio module body 41 which is insertable in the receptacle 39 and is supported in the receptacle 39 on five sides. The antenna 35 protrudes from the radio module body 41 and projects out of the receptacle 39 at the upper side O of the extension section 19.

As can be seen from FIGS. 2B and 3B, the receptacle 39 is open at the upper side O of the extension section 19 so that the radio module 33 or the radio module body 41 may be inserted in the receptacle 39 by a linear movement from the upper side O of the extension section 19. In that, the inserted radio module 33 is supported on five sides in the receptacle 39, removal of the radio module 33 from the receptacle 39 is also possible solely by a linear movement in the direction of the upper side O of the extension section 19. In this way, the radio module 33 can be reliably held in the receptacle 39 during use of the remote control unit 11.

Furthermore, the radio module 33 or the radio module body 41 has a broadside 43, which forms a side surface of the radio module 33 with the largest surface area. In the inserted state of the radio module 33, the broadside 43 is opposite the operating element 27 and is overlapped by two edge sections 45 which are oriented perpendicular to each other so that the radio module 33 is supported in the receptacle 39 in a direction opposite to the operating element 27. However, by having the broadside 43 overlapped only by the web-like edge sections 45, the broadside 43 remains substantially visible. This broadside 43 which remains visible allows, in particular, the radio module 33 to be pushed out of the receptacle 39 by contacting the broadside 43, so that the radio module 33 may be detached from the extension section 19 without the need for tools, and without, for example, having to be pulled out by the antenna 35. In addition, a label and/or a marking of the radio module 33 may be applied at the broadside 43, which also remains visible when the radio module 33 is in the inserted state and can be checked by a user. For example, information about a radio standard and/or a radio frequency over which the radio module 33 communicates may be shown at the broadside. Also at a side facing away from the display section 21, the receptacle 39 is partially open and overlaps the radio module 33 only in sections, so that it is also possible to remove the radio module 33 from the receptacle 39 by pushing the radio module 33 at this side.

In particular, such a releasable connection of the radio module 33 to the remote control unit 11 can allow the remote control unit 11 to be provided with a plurality of different radio modules, from which a respective one may be selectively inserted in the receptacle 39. For example, the plurality of radio modules associated with the remote control unit 11 may be configured to communicate via different radio standards and/or different radio frequencies. As a result, the remote control unit 11 may, for example, be flexibly adapted to the motion picture camera 113 to be controlled, so that, the motion picture camera 113, to some extent, can specify the radio standard or radio frequency to be used and the remote control unit 11 can be retrofitted accordingly.

By inserting the radio module 33 in the receptacle 39 in such a way that the antenna 35 of the radio module 33 is positioned at the end portion 37 of the extension section 19, the antenna 35 does not have to be attached, in particular, to an upper side O' of the display section 21 as it would be conventionally, so that this upper side O' remains free and may be used, for example, for attaching an accessory device. For this purpose, an attachment device 47 is provided at the upper side O' of the display section 21, which comprises, in particular, a fastening rail 53 and a fastening recess 55, wherein the fastening recess 55 may be formed, for example, as a screw hole. In order to connect an accessory device and, in particular, a viewing monitor to the remote control unit 11, the accessory device may, for example, be pushed onto the fastening rail 53 and/or hooked on the fastening rail 53, so that a form-fitting engagement can be achieved. Alternatively or additionally, an accessory device may be attached to the upper side O' of the display section 21 by means of fastening means introduced in the fastening recesses 55, for example, by means of fastening screws.

In addition, the display section 21 has a planar surface 49 at the upper side O', against which in particular an accessory device may lie flat and thereby be supported. A surface 51 of the grip section 15, which also has a planar configuration and extends in a common plane with the surface 49 of the display section 21, adjoins the surface 49 so that an accessory device may also be jointly supported by the surfaces 49 and 51. For example, by attaching a viewing monitor by means of the attachment device 47, it is possible for a user of the remote control unit 11 to view an image frame recorded by the motion picture camera 113, in order to, if required, carry out any necessary adjustments to the motion picture camera 113. A display of such a viewing monitor attached to the remote control unit 11 may, for this purpose, be oriented in particular inclined to the base plane G, in order to be arranged comfortably in the field of view of the user during use of the remote control unit 11.

FIGS. 3A and 3B further illustrate that the remote control unit 11 is configured to be set down on a horizontal ground plane 57 in a stable inclined standing position S. In this inclined standing position S, the viewing axis B of the remote control unit 11 is oriented in such a way that it intersects the ground plane 57 at an acute angle, whereby this angle lies in particular between 25 degrees and 60 degrees and/or may be 30 degrees or 45 degrees. Thus, in the inclined standing position S, the viewing axis B is oriented in such a way that it corresponds to a natural and comfortable viewing direction of a user, so that the user can comfortably view the display section 21 or the display 23 of the remote control unit 11 which is placed for example on a table. In particular, in the inclined standing position S, the remote control unit 11 is furthermore tilted exclusively about a horizontal axis running parallel to the base plane G compared to a vertical orientation of the base plane G, so that in the inclined standing position S an upper edge 59 of the display section 21 and an upper edge 61 of the display 23 run horizontally and, for example, numbers shown on the display 23 in the inclined standing position are not shown rotated about the viewing axis B.

In order to achieve such a stable inclined standing position S of the remote control unit 11, the extension section 19 of the remote control unit 11 comprises at an underside U a planar support section 63 which is oriented at an angle of placement to the base plane G of the remote control unit 11 having a value of 90 degrees minus the acute angle of orientation of the viewing axis B to the ground plane 57 (cf. FIG. 2B). Furthermore, the display section 21 and the grip section 15 also comprise at the underside U a respective support section 65 or 67, which is also oriented to the base plane G at the angle of placement and is formed by an edge at the rear side R of the display section 21, so that in the inclined standing position S, the remote control unit 11 is jointly supported at the support sections 63, 65 and 67 (cf. FIGS. 3A and 3B).

The remote control unit 11 can thus be set down in the inclined standing position S and placed on the horizontal ground plane 57 such that the viewing axis B of the remote control unit 11 intersects the horizontal ground plane 57 at an acute angle in the direction of the rear side R' of the remote control unit 11 and the display 23 points upwards. FIGS. 2A and 2B illustrate that the remote control unit 11 may, alternatively, also be set down in an upright position A, in which the viewing axis B of the remote control unit 11 is oriented parallel to the ground plane 57 and thus horizontal. In this upright position A, the remote control unit 11 is supported by a further support section 69 of the display section 21 formed at the underside U of the remote control unit 11 and a further support section 71 of the grip section 15, wherein the further support sections 69 and 71 are configured planar and are oriented orthogonal to the base plane G of the remote control unit 11. For example, a user may selectively place down the remote control unit 11 in the inclined standing position S or in the upright position A depending on the height of the horizontal ground plane 57, in particular, so as to always be able to view the display 23 as comfortably as possible.

Thus, having a compact structure, the remote control unit 11 enables in particular a comfortable and simple handling, as well as extensive control of the motion picture camera 113, in that various control commands for the motion picture camera 113 can be set by means of the rotatable operating element 27 and the further operating element 29. Furthermore, due to the interchangeable radio module 33, the remote control unit 11 may be flexibly adapted to different motion picture cameras or different radio standards and/or radio frequencies, wherein the arrangement of the antenna 35 at the extension section 19 enables interference-free communication between the remote control unit 11 and the motion picture camera 113. Moreover, due to the attachment device 47, the functionality of the remote control unit 11 may be selectively further extended in that additional accessory devices may be attached at the upper side O' of the display section 21.

LIST OF REFERENCE NUMERALS 11 remote control unit
13 first side of remote control unit
15 grip section
17 second side of remote control unit
19 extension section
21 display section
23 display
25 operating side
27 operating element
29 further operating element
31 fastening recess
33 radio module
35 antenna
37 end portion of extension section
39 receptacle
41 radio module body
43 broadside of radio module
45 edge section
47 attachment device
49 surface
51 surface
53 fastening rail
55 fastening recess
57 horizontal ground plane
59 upper edge of display section
61 upper edge of display
63 support section of extension section
65 support section of grip section
67 support section of display section
69 further support section of display section
71 further support section of grip section
113 motion picture camera
115 lens setting motor
116 lens-ring
117 lens setting motor
118 lens-ring
119 lens setting motor
120 lens-ring
149 lens
153 viewfinder
155 camera body A upright position
B viewing axis
G base plane
O upper side of extension section
O' upper side of display section
R rear side of display section
R' rear side of remote control unit
U underside
V front side of display section
V' front side of remote control section

The invention claimed is:

1. A remote control unit for controlling a motion picture camera,
comprising
a grip section arranged at a first side of the remote control unit for holding the remote control unit,
an extension section arranged at a second side of the remote control unit opposite the first side, and
a display section which extends along a base plane from the grip section to the second side of the remote control unit, the display section comprising a front side and a rear side,
wherein the display section comprises a display at its front side which is configured to display at least one of set control commands or values of parameters of the motion picture camera, wherein the display is oriented orthogonal to a viewing axis of the remote control unit,
wherein the extension section at the second side of the remote control unit projects away from the display section along the viewing axis beyond the rear side of the display section,
wherein the extension section comprises an operating side facing away from the grip section, at which a rotatable operating element for setting control commands for the motion picture camera is arranged, and
wherein the remote control unit comprises a radio module which is configured to wirelessly transmit the set control commands to the motion picture camera or to wirelessly receive the values of parameters of the motion picture camera, wherein the radio module comprises an antenna, the antenna being positioned at an end portion of the extension section of the remote control unit which is offset from the display section along the viewing axis beyond the rear side of the display section.

2. The remote control unit in accordance with claim 1, wherein the radio module is detachably connected to the extension section of the remote control unit.

3. The remote control unit in accordance with claim 2, wherein the extension section of the remote control unit comprises a receptacle in which the radio module is insertable.

4. The remote control unit in accordance with claim 1, wherein the display section of the remote control unit comprises an upper side which extends from the grip section to the second side of the remote control unit, wherein at the upper side of the display section an attachment device for attaching an accessory device is arranged,
wherein the attachment device comprises a fastening rail that extends along the upper side of the display section between the grip section and the second side of the remote control unit,
wherein the antenna of the radio module is positioned offset from the fastening rail along the viewing axis.

5. The remote control unit in accordance with claim 4, wherein the upper side of the display section comprises a planar surface which is oriented transverse or perpendicular to the base plane or to the display section.

6. The remote control unit in accordance with claim 5, wherein the grip section comprises a planar surface at an upper side, which adjoins the planar surface at the upper side of the display section and forms a common plane with the planar surface at the upper side of the display section.

7. A remote control unit for controlling a motion picture camera,
comprising
a grip section arranged at a first side of the remote control unit for holding the remote control unit,
an extension section arranged at a second side of the remote control unit opposite the first side, and
a display section which extends along a base plane from the grip section to the second side of the remote control unit, the display section comprising a front side and a rear side,
wherein the display section comprises a display at its front side which is configured to display at least one of set control commands or values of parameters of the motion picture camera, wherein the display is oriented orthogonal to a viewing axis of the remote control unit,
wherein the extension section projects away from the display section along the viewing axis at the second side of the remote control unit, and
wherein the extension section comprises an operating side facing away from the grip section, at which a rotatable operating element for setting control commands for the motion picture camera is arranged,
wherein the remote control unit comprises a radio module which is configured to wirelessly transmit the set control commands to the motion picture camera or to wirelessly receive the values of parameters of the motion picture camera,
wherein the radio module comprises an antenna, and
wherein the radio module including its antenna is detachably connected to the extension section of the remote control unit.

8. The remote control unit in accordance with claim 7, wherein the extension section of the remote control unit comprises a receptacle in which the radio module is inserted, wherein the receptacle is positioned offset from the display section along the viewing axis beyond the rear side of the display section.

9. The remote control unit in accordance with claim 8, wherein the radio module inserted in the receptacle is configured to be removable from the receptacle without tools.

10. The remote control unit in accordance with claim 7, wherein the remote control unit comprises a plurality of radio modules, from which one is selectively insertable in the receptacle at a given time, wherein a first radio module of the plurality of radio modules is configured to communicate over at least one of a first radio standard or a first radio frequency, and wherein a second radio module of the plurality of radio modules is configured to communicate over at least one of a second radio standard that is different from the first radio standard or a second radio frequency that is different from the first radio frequency, each of the plurality of radio modules comprising its own antenna.

11. A remote control unit for controlling a motion picture camera, comprising
- a grip section arranged at a first side of the remote control unit for holding the remote control unit,
- an extension section arranged at a second side of the remote control unit opposite the first side, and
- a display section which extends along a base plane from the grip section to the second side of the remote control unit, the display section comprising a front side and a rear side and further comprising an upper edge, wherein the display section comprises a display at its front side which is configured to display at least one of set control commands or values of parameters of the motion picture camera, wherein the display is oriented orthogonal to a viewing axis of the remote control unit, wherein the extension section projects away from the display section along the viewing axis at the second side of the remote control unit, and wherein the extension section comprises an operating side facing away from the grip section, at which a rotatable operating element for setting control commands for the motion picture camera is arranged, wherein the remote control unit is configured to be placed down on a horizontal ground plane in a stable inclined standing position in which the viewing axis of the remote control unit intersects the ground plane at an acute angle of orientation, wherein the upper edge of the display section is oriented horizontal when the remote control unit is placed down on the horizontal ground plane in the inclined standing position.

12. The remote control unit in accordance with claim 11, wherein the acute angle of orientation has a value between 25 degrees and 60 degrees.

13. The remote control unit in accordance with claim 11, wherein at least one of the extension section of the remote control unit, the display section of the remote control unit, or the grip section of the remote control unit comprises a support section at an underside which is oriented at an angle of placement relative to the base plane of the remote control unit, wherein the angle of placement corresponds to a value of 90 degrees minus the acute angle of orientation of the viewing axis.

14. The remote control unit in accordance with claim 13, wherein the remote control unit is configured to be selectively placed down on the horizontal ground plane in the stable inclined standing position, or in a stable upright position in which the viewing axis of the remote control unit is oriented parallel to the horizontal ground plane, wherein at least one of the display section of the remote control unit or the grip section of the remote control unit comprises a further support section at an underside which is oriented orthogonal to the base plane of the remote control unit.

15. The remote control unit in accordance with claim 11, wherein the remote control unit is configured to be selectively placed down on the horizontal ground plane in the stable inclined standing position, or in a stable upright position in which the viewing axis of the remote control unit is oriented parallel to the horizontal ground plane.

16. The remote control unit in accordance with claim 11, wherein the remote control unit comprises a radio module which is configured to wirelessly transmit the set control commands to the motion picture camera or to wirelessly receive the values of parameters of the motion picture camera.

17. The remote control unit in accordance with claim 16, wherein the radio module comprises an antenna, wherein the antenna is positioned at an end portion of the extension section of the remote control unit which is offset from the display section along the viewing axis beyond the rear side of the display section.

* * * * *